US009702111B2

(12) United States Patent
Sokoloski

(10) Patent No.: US 9,702,111 B2
(45) Date of Patent: Jul. 11, 2017

(54) RIPPER AND WINCH ASSEMBLIES FOR A BULLDOZER CRAWLER TRACTOR

(71) Applicant: Sheldon Louis Sokoloski, Peace River (CA)

(72) Inventor: Sheldon Louis Sokoloski, Peace River (CA)

( * ) Notice: Subject to any disclaimer, the term of this patent is extended or adjusted under 35 U.S.C. 154(b) by 0 days.

(21) Appl. No.: 14/840,273

(22) Filed: Aug. 31, 2015

(65) Prior Publication Data

US 2017/0058482 A1 Mar. 2, 2017

(51) Int. Cl.

*A01B 49/04* (2006.01)
*E02F 3/76* (2006.01)
*E02F 5/32* (2006.01)
*B66D 1/60* (2006.01)

(52) U.S. Cl.

CPC .............. *E02F 3/7604* (2013.01); *B66D 1/60* (2013.01); *E02F 5/32* (2013.01)

(58) Field of Classification Search

CPC ......... A01B 35/10; A01B 35/14; A01B 35/32; A01B 49/04; A01B 76/00; E02F 3/7604; E02F 3/80
USPC .................... 172/133, 300, 438, 468; 37/404
See application file for complete search history.

(56) References Cited

U.S. PATENT DOCUMENTS 2,292,904 A * 8/1942 Shollenberger ........ A01B 13/08 172/485
2,362,407 A * 11/1944 Ruddock ............... E02F 3/7604 172/245
2,475,146 A * 7/1949 Le Tourneau ........ E01C 23/121 172/407
2,490,904 A * 12/1949 Gustafson ................. E02F 5/32 172/611
2,520,359 A * 8/1950 Butch ..................... E02F 3/815 172/438
2,626,468 A * 1/1953 Dobrinich, Jr. ....... E02F 3/8155 172/777
3,207,232 A * 9/1965 Bechman ............... A01B 13/08 172/239
3,249,336 A 5/1966 Brown et al.
3,613,803 A 10/1971 Payne
4,042,261 A * 8/1977 Babbitt, Jr. .......... B62D 49/065 172/699
4,679,635 A * 7/1987 Fields .................... A01B 13/08 172/260.5
5,169,279 A * 12/1992 Zimmerman ........ A01B 59/062 172/439
5,486,084 A 1/1996 Pitman et al.
6,129,298 A 10/2000 Nye
6,334,269 B1 1/2002 Dilks
6,892,825 B1 5/2005 Hopson
8,371,049 B2 2/2013 Tajiri et al.

(Continued)

FOREIGN PATENT DOCUMENTS

CA 2767999 1/2011
CN 202298695 7/2012
CN 202390867 8/2012

*Primary Examiner* — Gary Hartmann
(74) *Attorney, Agent, or Firm* — Giuseppe Mariconda

(57) ABSTRACT

An apparatus is for a bulldozer crawler tractor. The apparatus includes a mounting assembly configured to fixedly attach to the bulldozer crawler tractor. A ripper assembly is configured to be operatively attached to the mounting assembly. A winch assembly is configured to be operatively mounted to the ripper assembly.

18 Claims, 9 Drawing Sheets

(56) References Cited

U.S. PATENT DOCUMENTS

| | | | | |
|---|---|---|---|---|
| 2004/0060208 | A1 | 4/2004 | Wagner | |
| 2007/0163792 | A1 * | 7/2007 | Parrish | E02F 3/8152 172/777 |
| 2009/0188684 | A1 * | 7/2009 | Parrish | E02F 1/00 172/684.5 |

* cited by examiner

RIPPER AND WINCH ASSEMBLIES FOR A BULLDOZER CRAWLER TRACTOR

TECHNICAL FIELD

This document relates to the technical field of (and is not limited to) an apparatus for a bulldozer crawler tractor.

BACKGROUND

A bulldozer is a crawler (continuous tracked tractor, bulldozer crawler tractor) equipped with a substantial metal plate (known as a blade) used to push large quantities of soil, sand, rubble, or other such material during construction or conversion work.

The bulldozer may be equipped at the rear with a claw-like device (known as a ripper) to loosen densely compacted materials, or a winch used for towing, etc. The term "bulldozer" is often used erroneously to mean any heavy equipment (sometimes a loader and sometimes an excavator), but precisely, the term refers only to a tractor (usually tracked) fitted with a dozer blade.

The ripper is the long claw-like device positioned on the back section of the bulldozer. Rippers can come as a single (single shank/giant ripper) or in groups of two or more (multi shank rippers). Usually, a single shank is preferred for heavy ripping. A multi-shank ripper may be deployed and used for light ripping operations. The ripper shank is fitted with a replaceable tungsten steel alloy tip. The ripper is used to break the ground surface rock or pavement into small rubble easy to handle and transport that can then be removed (so grading can take place). With agricultural ripping, a farmer breaks up rocky or very hard earth that is otherwise unploughable (in order to farm the land). With oilfield ripping operations, the multi-shank ripper is used to rip small areas of hard packed dirt, roots and stumps, etc.

The winch is a hydraulic-powered rotating drum with a wire or rope cable positioned on the back section of the bulldozer. The winch is used for towing or pulling. Fairlead rollers are attached so the machine can winch sideways (if desired).

An example of the bulldozer is the CATERPILLAR (TRADEMARK) Model D7 bulldozer that is a large track-type tractor designed and manufactured by CATERPILLAR Inc., and is as a bulldozer equipped with a detachable large blade and a rear ripper single shank ripper attachment. The CATERPILLAR Model D7 bulldozer is equipped with a large blade, a rear multi-shank ripper attachment or a rear winch attachment.

SUMMARY

It will be appreciated that there exists a need to mitigate (at least in part) at least one problem associated with existing bulldozer crawler tractors. After much study of the known systems and methods with experimentation, an understanding of the problem and its solution has been identified and is articulated as follows:

Existing bulldozer crawler tractors have either a ripper assembly or a winch assembly (deployed as a rear attachment). Existing bulldozer crawler tractors have been traded out because of the rear attachment lacks the required assembly.

Therefore, by combining the ripper assembly and the winch assembly as a combination assembly that is mountable to the bulldozer crawler tractor, there is a synergy developed because of the improved versatility provided by such a combination.

To mitigate, at least in part, at least one problem associated with existing bulldozer crawler tractors, there is provided (in accordance with a major aspect) an apparatus. The apparatus is for a bulldozer crawler tractor. The apparatus includes (and is not limited to) a mounting assembly that is configured to fixedly attach to the bulldozer crawler tractor. A ripper assembly is configured to be operatively attached to the mounting assembly. A winch assembly is configured to be operatively mounted to the ripper assembly.

To mitigate, at least in part, at least one problem associated with existing bulldozer crawler tractors, there is provided (in accordance with a major aspect) an apparatus. The apparatus includes (and is not limited to) a bulldozer crawler tractor. A mounting assembly is configured to fixedly attach to the bulldozer crawler tractor. A ripper assembly is configured to be operatively attached to the mounting assembly. A winch assembly is configured to be operatively mounted to the ripper assembly.

Other aspects are identified in the claims.

Other aspects and features of the non-limiting embodiments may now become apparent to those skilled in the art upon review of the following detailed description of the non-limiting embodiments with the accompanying drawings.

BRIEF DESCRIPTION OF THE DRAWINGS

The non-limiting embodiments may be more fully appreciated by reference to the following detailed description of the non-limiting embodiments when taken in conjunction with the accompanying drawings, in which.

Figure 1:
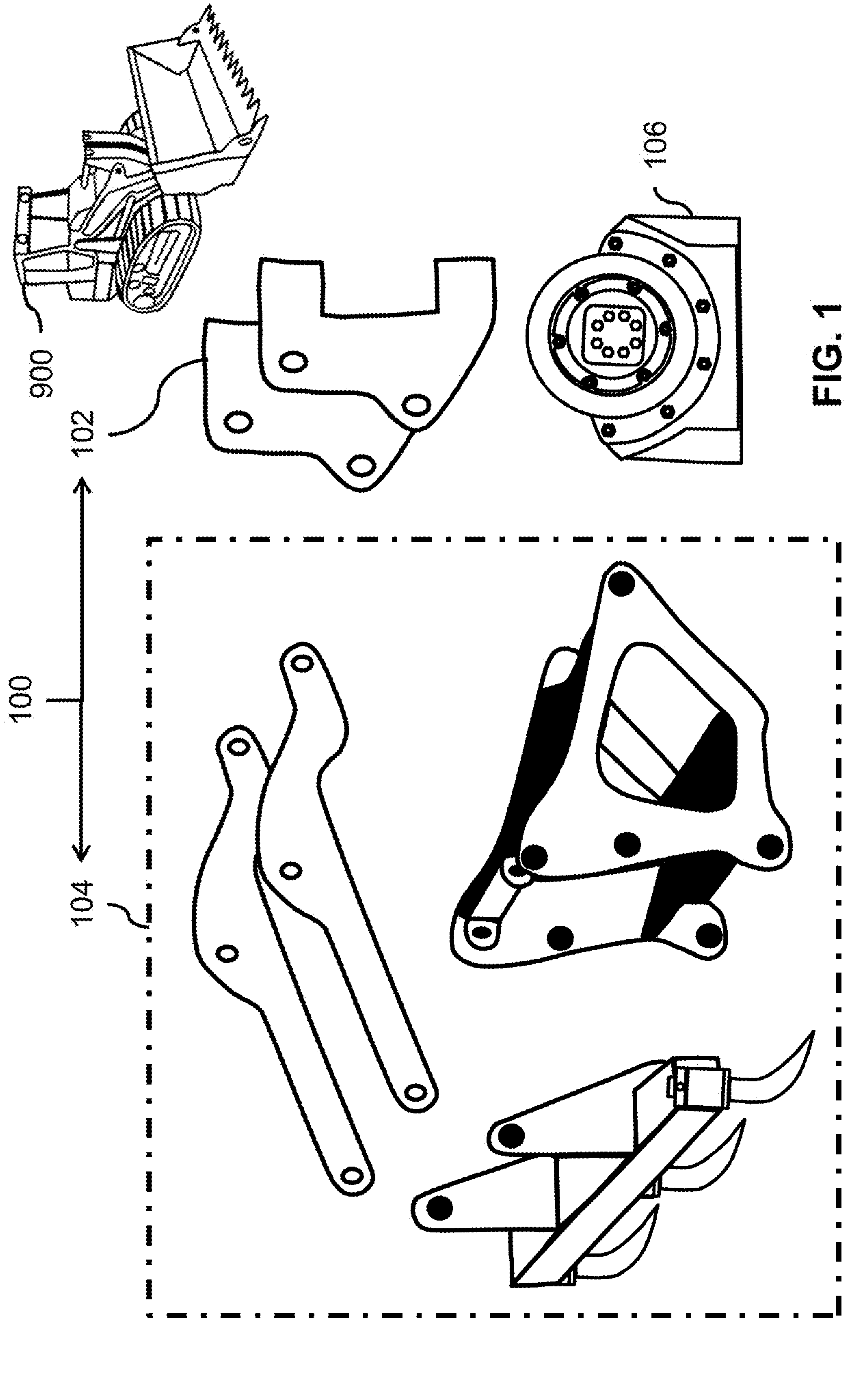
FIG. 1 (SHEET 1 of 9 SHEETS) depicts a schematic view of an embodiment of an apparatus for a bulldozer crawler tractor.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted.

Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, but well-understood, elements that are useful or necessary in commercially feasible embodiments are often not depicted to provide a less obstructed view of the embodiments of the present disclosure.

LISTING OF REFERENCE NUMERALS USED IN THE DRAWINGS

100 apparatus
102 mounting assembly
104 ripper assembly
106 winch assembly
200 vehicle mount
202 top swivel position
204 bottom swivel point
206 upper extension portion
208 lower extension portion
300 actuator assembly
302 ripper-moving assembly
304 ripper-support assembly
306 winch-support assembly
400 first attachment point
402 second attachment point
500 first swivel point
501 second swivel point
502 first pin receiver
504 safety lock pin
600 vertically-aligned support section
600 vertically-aligned support sections
602 upper swivel point
604 lower swivel point
606 horizontally-extending support
608 mounting point
610 ripper-shank assembly
700 third swivel point
702 fourth swivel point
704 connection point
706 second pin receiver
708 lateral sidewalls
900 bulldozer crawler tractor
902 vehicle tracks

DETAILED DESCRIPTION OF THE NON-LIMITING EMBODIMENT(S)

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the invention is defined by the claims. For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

FIG. 1 depicts a schematic view of an embodiment of an apparatus 100 for a bulldozer crawler tractor 900. FIG. 1 depicts a partial exploded view of the apparatus 100 and a perspective view of the bulldozer crawler tractor 900.

In accordance with a first specific embodiment (as depicted in FIG. 1), the apparatus 100 includes a combination of a mounting assembly 102 (also called an auxiliary-equipment attachment), a ripper assembly 104 and a winch assembly 106. The ripper assembly 104 may be called a multi-shank parallelogram ripper. It will appreciated that for the first specific embodiment, the apparatus 100 does not include the bulldozer crawler tractor 900. It will be appreciated that the retrofit manufacturers of heavy machinery (heavy-moving equipment) are expected to be interested in the first specific embodiment. More specifically, a retrofit manufacturer would be interested in retrofitting an existing instance of the bulldozer crawler tractor 900 with the mounting assembly 102, the ripper assembly 104 and the winch assembly 106. It will be appreciated that the apparatus 100, as assembled, is depicted in FIGS. 4A to 4D.

In accordance with a second specific embodiment (as depicted in FIG. 1), the apparatus 100 includes a combination of the bulldozer crawler tractor 900, the mounting assembly 102, the ripper assembly 104 and the winch assembly 106. It will be appreciated that manufacturers of heavy machinery (heavy-moving equipment) are expected to be interested in the second specific embodiment.

In accordance with the specific embodiments (as depicted in FIG. 1), the mounting assembly 102 is configured to fixedly attach to the bulldozer crawler tractor 900. The ripper assembly 104 is configured to be operatively attached to (such as, pivotally mounted to) the mounting assembly 102. The winch assembly 106 is configured to be operatively mounted to (fixedly mounted to) the ripper assembly 104.

In accordance with the specific embodiments (as depicted in FIG. 1), the winch assembly 106 includes a hydraulic winch and any equivalent thereof, etc. Preferably, the winch assembly 106 includes a planetary hydraulic driven winch system. The winch assembly 106 has equal variable line speed control, with or without free fall. The winch assembly 106 includes hydraulic motors with two different single-speed motors, and one motor having two speeds (a high speed setting and a low speed setting). The winch assembly 106 includes a guide assembly (such as, fairlead rollers) configured to slidably guide the winch assembly 106 into and out of (installable into and removable from) the ripper assembly 104 (if so desired).

Figure 2:
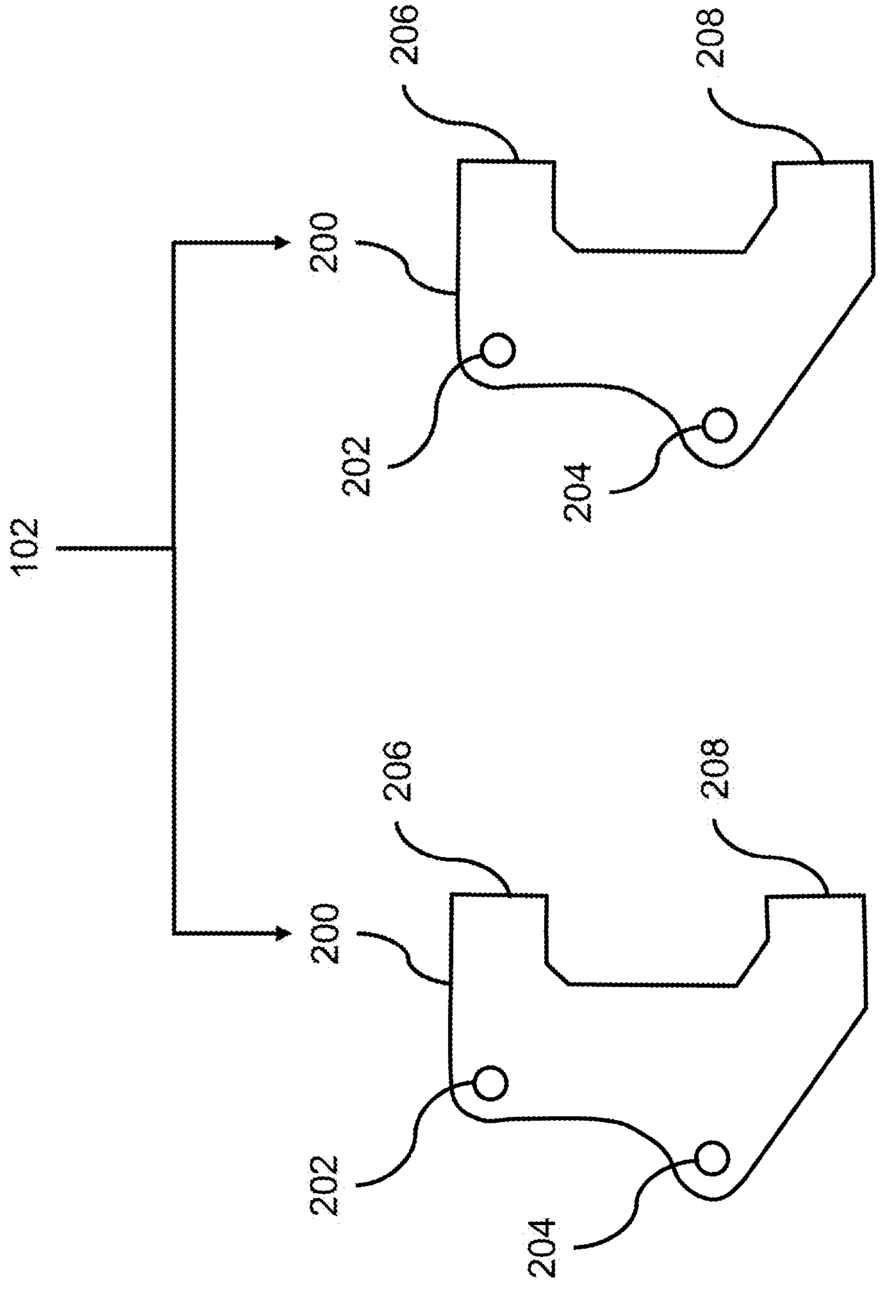
FIG. 2 (SHEET 2 of 9 SHEETS) depicts a side view of an embodiment of a mounting assembly of the apparatus of FIG. 1.

FIG. 2 depicts a side view of an embodiment of a mounting assembly 102 of the apparatus 100 of FIG. 1.

Figure 4A:
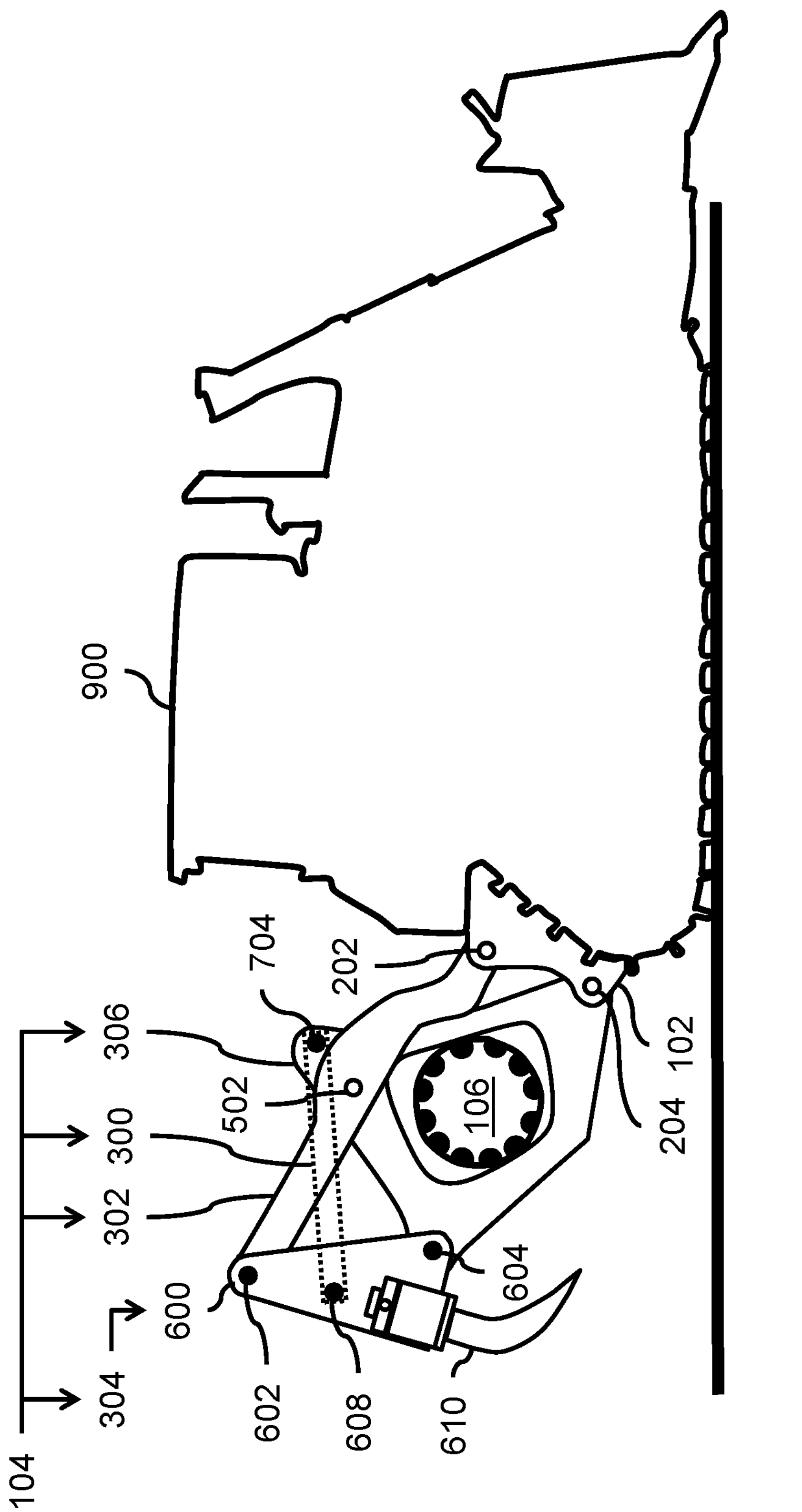
FIGS. 4A, 4B, 4C and 4D (SHEETS 5 to 8 of 9 SHEETS) depict side views of embodiments of the apparatus of FIG. 1 installed to the bulldozer crawler tractor.

In accordance with the embodiment (as depicted in FIG. 2), the mounting assembly 102 includes machine mounts 200 (a pair are depicted). The machine mounts 200 are configured to be fixedly attached (mounted) to a rear section of the bulldozer crawler tractor 900 (as depicted in FIG. 4A). The machine mounts 200 are spaced apart from each other in a side by side arrangement once the machine mounts 200 are operatively fixedly attached to the rear section of the bulldozer crawler tractor 900.

Figure 3A:
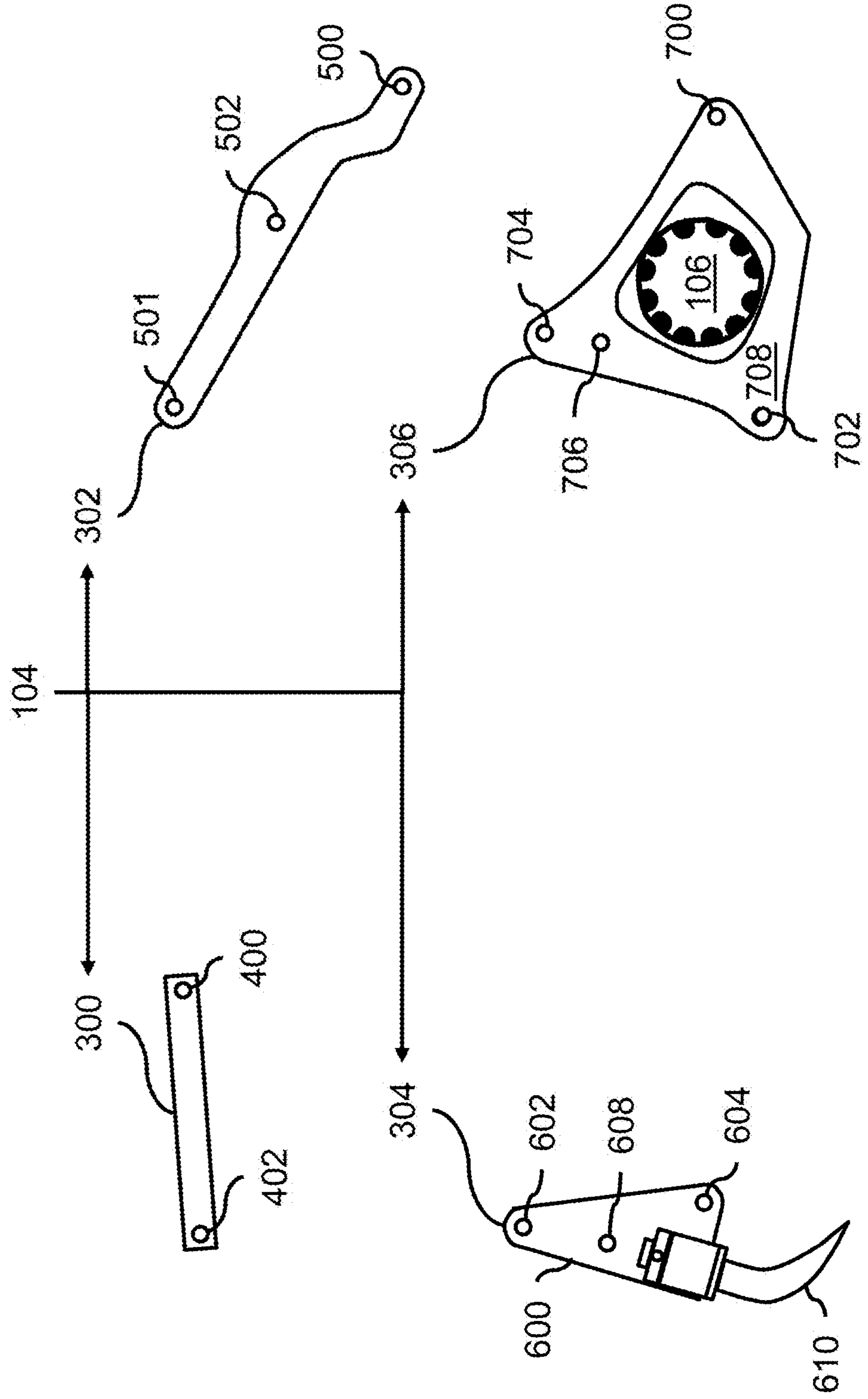
FIGS. 3A and 3B (SHEETS 3 and 4 of 9 SHEETS) depict schematic views of embodiments of a ripper assembly of the apparatus of FIG. 1.
Figure 3B:
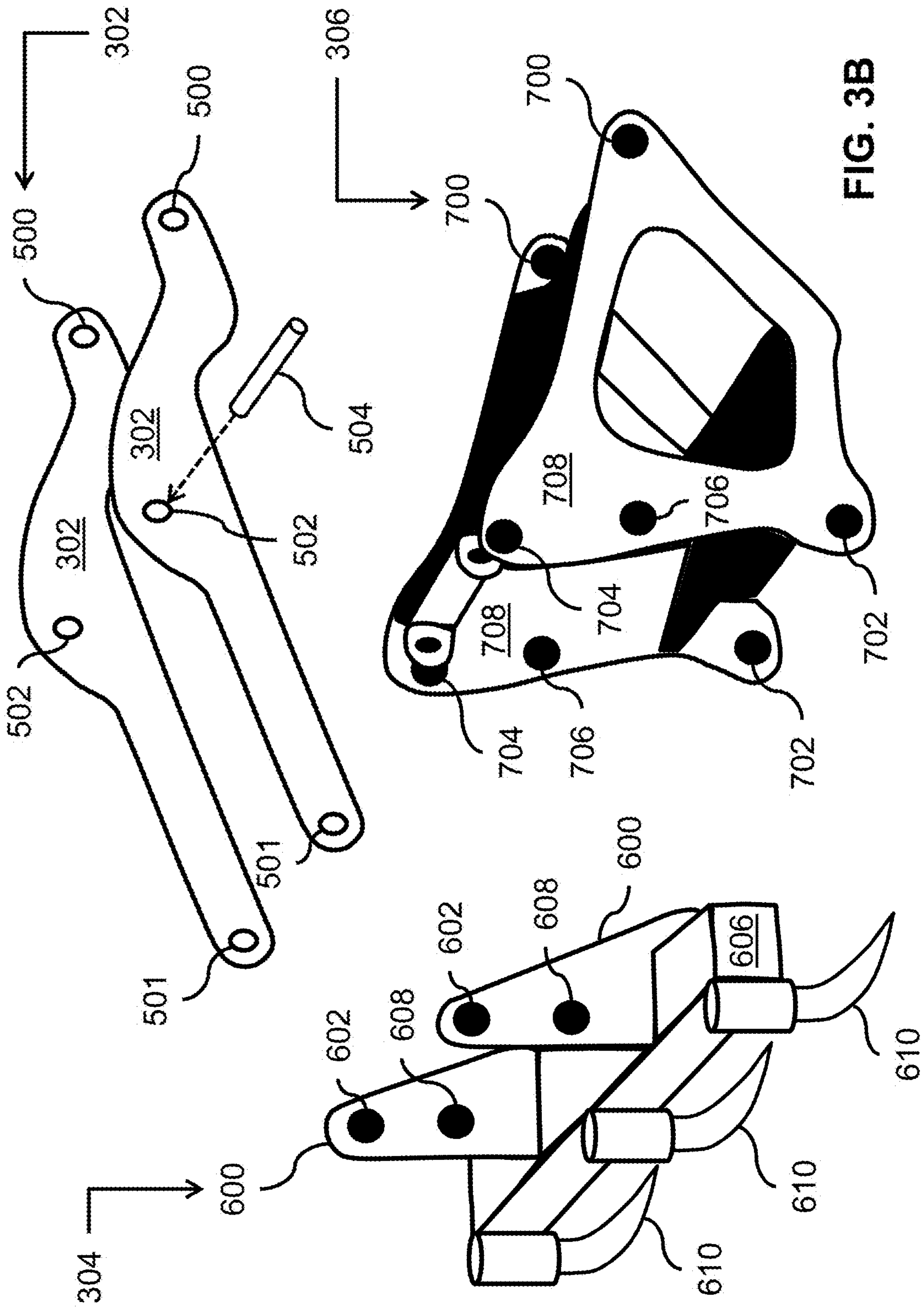

The vehicle mount 200 defines a top swivel position 202. The top swivel position 202 is also called a swivel point, and two instances are depicted. The top swivel positions 202 (of each vehicle mount 200) are spaced apart from each other once the machine mounts 200 are operatively fixedly attached to the rear section of the bulldozer crawler tractor 900 (in a spaced apart arrangement). The top swivel position 202 is configured to be attached to the first swivel point 500 of the ripper-moving assembly 302 (as depicted in FIGS. 3A and 3B and described below).

The vehicle mount 200 also defines a bottom swivel point 204 (two instances are provided). The bottom swivel points 204 of each vehicle mount 200 are spaced apart from each other once the machine mounts 200 are operatively fixedly attached to the rear section of the bulldozer crawler tractor 900. The bottom swivel points 204 are spaced apart from the top swivel positions 202. The bottom swivel point 204 is configured to be attached to a third swivel point 700 of the winch-support assembly 306 (as depicted in FIGS. 3A and 3B and described below).

The machine mounts 200 provide an upper extension portion 206 that extends laterally toward the bulldozer crawler tractor 900. The upper extension portion 206 is configured to operatively fixedly (securely) connect to the rear section of the bulldozer crawler tractor 900. The upper extension portions 206 are spaced apart from each other once the upper extension portions 206 are operatively mounted to the bulldozer crawler tractor 900.

The machine mounts 200 provide a lower extension portion 208 that extends laterally. The lower extension portions 208 are configured to operatively fixedly (securely) connect to the rear section of the bulldozer crawler tractor 900. The lower extension portions 208 are spaced apart from each other. The lower extension portions 208 are spaced apart from the upper extension portions 206. The lower extension portions 208 are positioned below the upper extension portions 206.

FIGS. 3A and 3B depict schematic views of embodiments of a ripper assembly 104 of the apparatus 100 of FIG. 1. FIG. 3A depicts a side view of the ripper assembly 104. FIG. 3B depicts a perspective view of the ripper assembly 104.

In accordance with the embodiments as depicted in FIG. 3A, the ripper assembly 104 includes a combination of an actuator assembly 300, a ripper-moving assembly 302, a ripper-support assembly 304 and a winch-support assembly 306.

The actuator assembly 300 may include a hydraulic piston, an electrical actuator or any equivalent thereof. The actuator assembly 300 includes a first end providing an first attachment point 400. The actuator assembly 300 also includes a second end having an second attachment point 402. The first attachment point 400 and the second attachment point 402 are spaced apart from each other (at the opposite ends of the actuator assembly 300). It will be appreciated that two instances of the actuator assembly 300 are deployed for the case where two instances of the ripper-moving assembly 302 are deployed (one instance of the actuator assembly 300 for each instance of the ripper-moving assembly 302). The first attachment point 400 is configured to be attached to the connection point 704 of the winch-support assembly 306. The second attachment point 402 is configured to be attached to the mounting point 608 of the ripper-support assembly 304.

The ripper-moving assembly 302 may be called longitudinally-extending bars. The ripper-moving assembly 302 is configured to move (lift or lower) the ripper-support assembly 304 (with assistance from the actuator assembly 300). Two instances of the ripper-moving assembly 302 are depicted, and are spaced apart from each other once the ripper-moving assembly 302 is operatively mounted to the winch-support assembly 306. The ripper-moving assembly 302 provides (defines) a first swivel point 500 positioned at an end of the ripper-moving assembly 302. The ripper-moving assembly 302 also provides (defines) a second swivel point 501 positioned at an opposite end of the ripper-moving assembly 302. The first swivel point 500 and the second swivel point 501 are spaced apart from each other. The first swivel point 500 is configured to be pivotally attached to the top swivel position 202 of the mounting assembly 102 (depicted in FIG. 2). The second swivel point 501 is configured to be pivotally attached to the lower swivel point 604 of the ripper-support assembly 304. The ripper-moving assembly 302 provides (defines) a first pin receiver 502 (also called a pin pocket) configured to receive (slidably receive) a safety lock pin 504. The safety lock pin 504 is configured to securely lock (prevent) movement of the ripper-moving assembly 302 relative to the winch-support assembly 306 once the safety lock pin 504 is inserted into the first pin receiver 502.

The ripper-support assembly 304 includes a vertically-aligned support section 600 (two instances are depicted and are spaced apart from each other). The vertically-aligned support sections 600 may be called stand-off sections. The vertically-aligned support sections 600 provide (define or have) an upper swivel point 602 (two instances are depicted, one for each instance of the vertically-aligned support sections 600). The upper swivel point 602 is configured to be pivotally attached to the second swivel point 501 of the ripper-moving assembly 302. The upper swivel points 602 of each vertically-aligned support section 600 are spaced apart from each other.

The vertically-aligned support sections 600 also provide (define) a lower swivel point 604 (two instances are provided, one for each instance of the vertically-aligned support sections 600). The lower swivel points 604 of each vertically-aligned support section 600 are spaced apart from each other. The lower swivel point 604 is positioned below the upper swivel point 602. The lower swivel point 604 is configured to be attached to a fourth swivel point 702 of the winch-support assembly 306.

The vertically-aligned support sections 600 also provide (define) mounting points 608 positioned between the upper swivel point 602 and the lower swivel point 604. The mounting point 608 is configured to be attached to the second attachment point 402 of the actuator assembly 300.

The ripper-support assembly 304 also provides a horizontally-extending support 606 (also called a bar) that extends between, and is fixedly connected to, the vertically-aligned support section 600. Two instances of the vertically-aligned support sections 600 are spaced apart from each other once the vertically-aligned support sections 600 are affixed to the horizontally-extending support 606. The vertically-aligned support sections 600 extend from the horizontally-extending support 606.

The ripper-support assembly 304 further includes a ripper-shank assembly 610 (three instances are depicted) that are operatively fixedly mounted to the horizontally-extending support 606, are spaced apart from each other and depend (extend downwardly) from the horizontally-extending support 606. The ripper-shank assembly 610 may be aligned in a curved or straight manner (depending on job conditions).

The winch-support assembly 306 may be called a movable parallelogram structure. The winch-support assembly 306 provides (defines) a third swivel point 700 configured to be pivotally connected with the bottom swivel points 204 of the mounting assembly 102 (as depicted in FIG. 2). The winch-support assembly 306 also defines a fourth swivel point 702 configured to be pivotally connected with the lower swivel point 604 of the ripper-support assembly 304. The winch-support assembly 306 also provides (defines) a connection point 704 configured to be connected with the first attachment point 400 of the actuator assembly 300. The winch-support assembly 306 also provides (defines) a second pin receiver 706 (also called a pin pocket) configured to receive the safety lock pin 504 once the first pin receiver 502 of the winch-support assembly 306 and the second pin receiver 706 of the winch-support assembly 306 are aligned with each other. The safety lock pin 504 is configured to lockably engage the winch-support assembly 306 with the ripper-moving assembly 302 to thereby lock the ripper-moving assembly 302 into a stationary position (an unmovable state of operation), thereby eliminating relative movement between the winch-support assembly 306 and the ripper-moving assembly 302.

The winch-support assembly 306 provides lateral sidewalls 708 that are spaced apart from each other. The winch assembly 106 (as depicted in FIG. 1) is operatively mounted within (between) the lateral sidewalls 708 of the winch-support assembly 306. Preferably, the winch assembly 106 is configured to be slidable in and out of the open end defined by the winch-support assembly 306 (as may be required). In accordance with a preferred embodiment, fairlead rollers (known and not depicted) are configured to enable to move the winch assembly 106 sideways.

Preferably, the controls of the bulldozer crawler tractor 900 include a lever joystick control configured to operate either the winch assembly 106 or the ripper assembly 104 by a user-selectable switch.

FIGS. 4A, 4B, 4C and 4D depict side views of embodiments of the apparatus 100 of FIG. 1 installed to the bulldozer crawler tractor 900. FIGS. 4A, 4B, 4C and 4D depict side views of the apparatus 100.

Figure 4B:
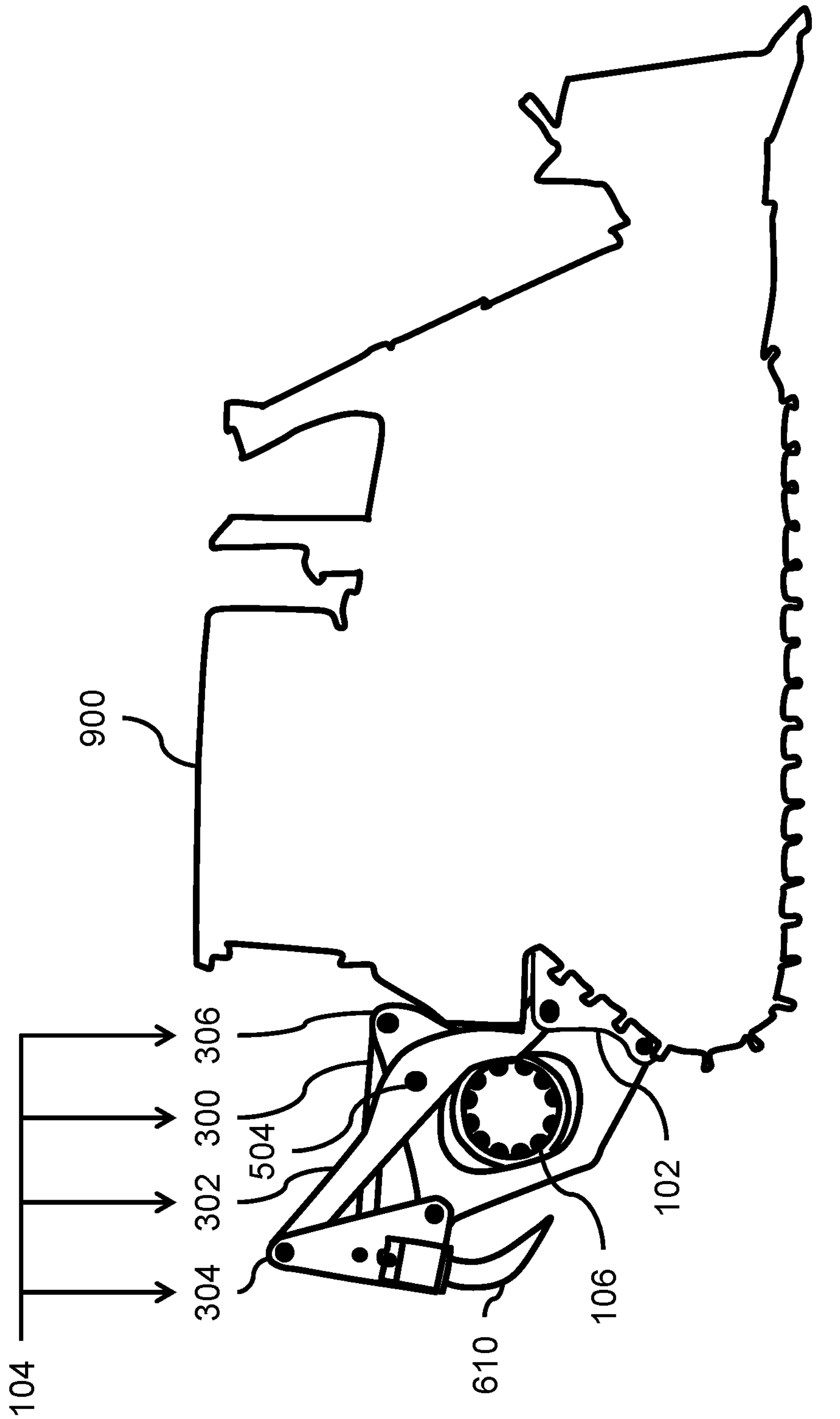
Figure 4C:
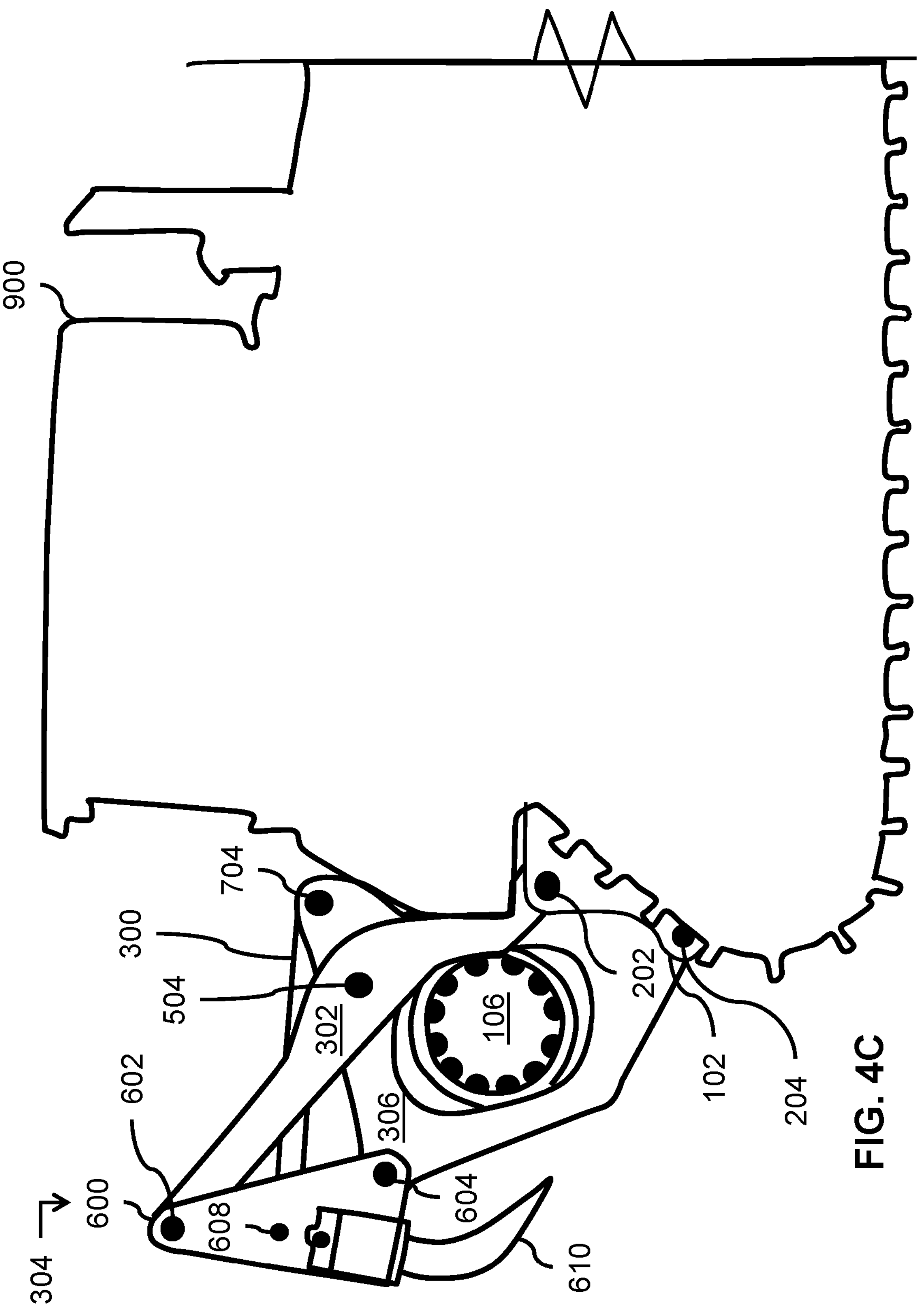
Figure 4D:
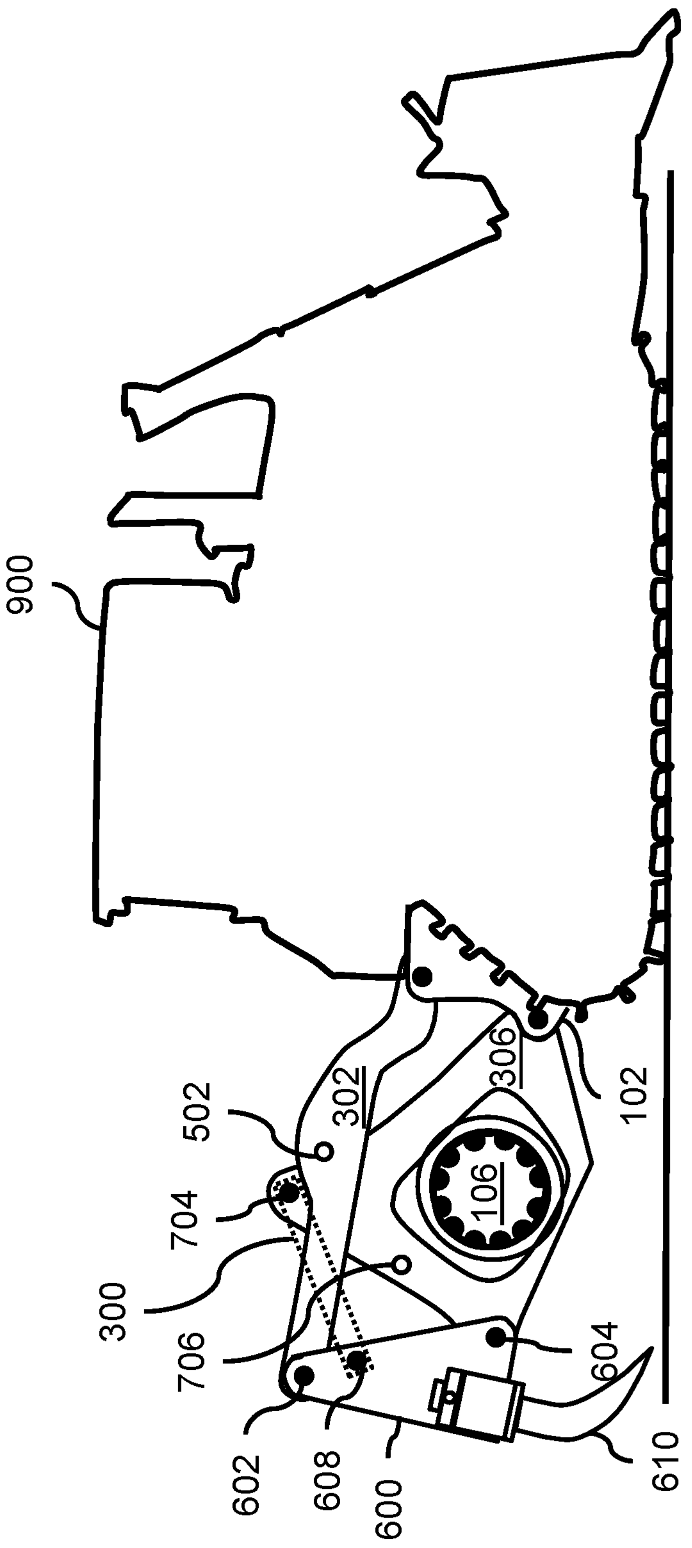

In accordance with the embodiment as depicted in FIG. 4A, the mounting assembly 102 is fixedly attached (mounted) to the rear section of the bulldozer crawler tractor 900. The winch-support assembly 306 is positioned between an upper position (as depicted in FIGS. 4B and 4C) and a lower position (as depicted in FIG. 4D). For this case, the safety lock pin 504 of FIG. 3B is not inserted into the first pin receiver 502 of the actuator assembly 300. In this manner, the winch-support assembly 306 may be moved (pivoted) in response to actuation of the actuator assembly 300 between the upper position and the lower position in such a way as to move the ripper-shank assembly 610, as may be required.

In accordance with the embodiments as depicted in FIGS. 4B and 4C, the winch-support assembly 306 is positioned at the upper position (an upright position or a fully upright position). For this case, the safety lock pin 504 of FIG. 3B is inserted into the first pin receiver 502 of the actuator assembly 300. In this manner, the winch-support assembly 306 may be fixedly locked, and therefore cannot be moved (pivoted) in response to actuation of the actuator assembly 300, and thereby the ripper-shank assembly 610 remains stationary. For this case, the winch assembly 106 may be deployed as required. For the case where the winch-support assembly 306 is raised to the upper position (as depicted in FIGS. 4B and 4C), the winch assembly 106 is revealed in such a way that the winch assembly 106 is usable.

For the case where the winch-support assembly 306 is positioned in the fully upright position, the safety lock pin 504 is received by the winch-support assembly 306 and the ripper-moving assembly 302 thereby locking out relative movement between the winch-support assembly 306 and the ripper-moving assembly 302 (causing the ripper-shank assembly 610 to remain stationary). For this case, the winch assembly 106 is operated and thus this arrangement removes safety concerns of any inadvertent (unwanted) operation of the winch-support assembly 306.

In accordance with the embodiment as depicted in FIG. 4D, the winch-support assembly 306 is positioned in the fully lowered position, in which (A) the ripper-shank assembly 610 may be used), and (B) the winch assembly 106 remains in a standby mode (the winch assembly 106 is positioned within the winch-support assembly 306).

Figure 5:
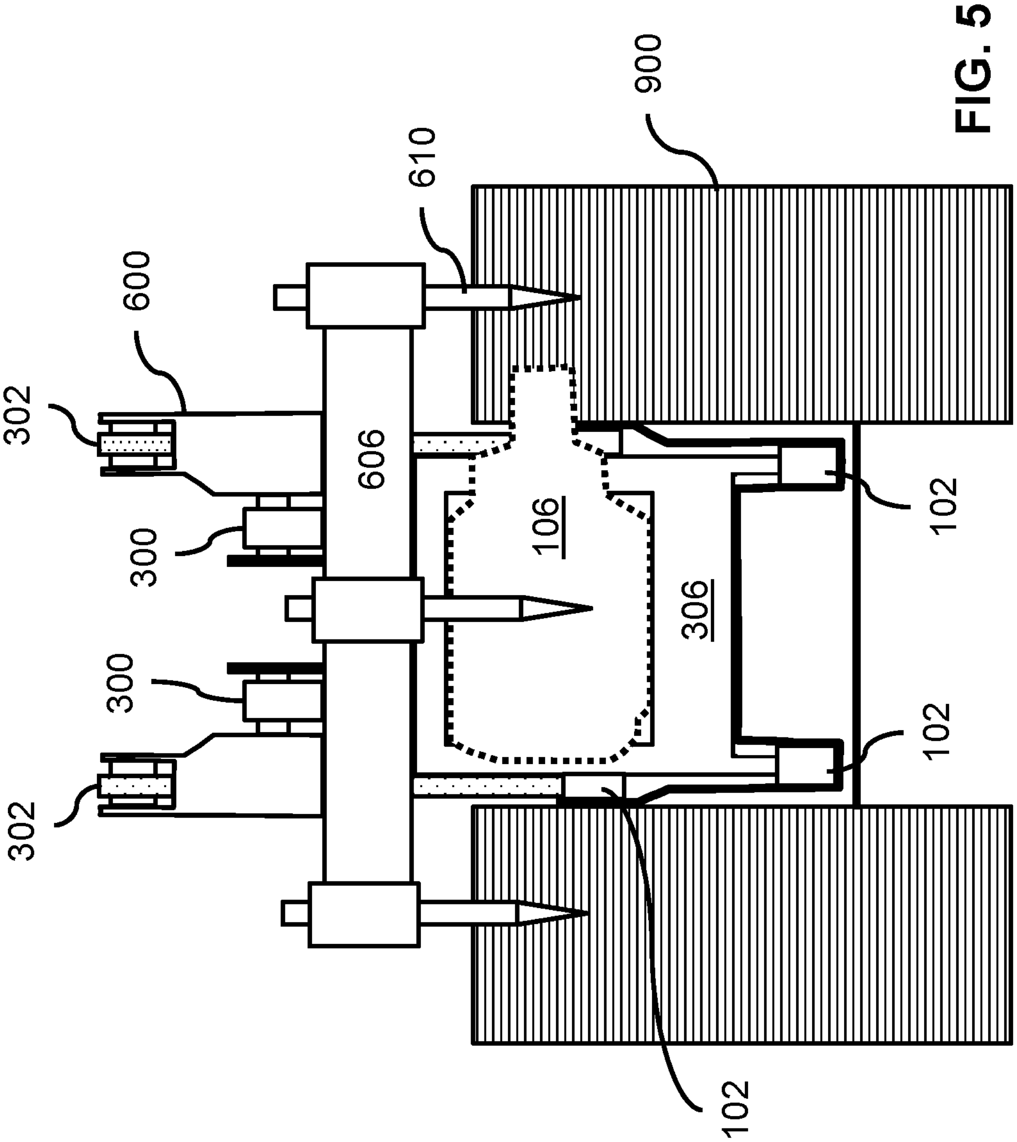
FIG. 5 (SHEET 9 of 9 SHEETS) depicts an end view of an embodiment of the apparatus of FIG. 1.

FIG. 5 depicts an end view of an embodiment of the apparatus 100 of FIG. 1. FIG. 5 depicts an end view of the apparatus 100.

The bulldozer crawler tractor 900 includes a set of vehicle tracks 902 positioned on opposite sides of the bulldozer crawler tractor 900.

This written description uses examples to disclose the invention, including the best mode, and also to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if they include equivalent structural elements with insubstantial differences from the literal language of the claims.

It may be appreciated that the assemblies and modules described above may be connected with each other as required to perform desired functions and tasks within the scope of persons of skill in the art to make such combinations and permutations without having to describe each and every one in explicit terms. There is no particular assembly or component that may be superior to any of the equivalents available to the person skilled in the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:

1. An apparatus for a bulldozer crawler tractor, the apparatus comprising:

a mounting assembly being configured to fixedly attach to the bulldozer crawler tractor;

a ripper assembly being configured to be operatively attached to the mounting assembly; and a winch assembly being configured to be operatively mounted to the ripper assembly; and wherein the ripper assembly includes a combination of:

an actuator assembly; and a ripper-moving assembly; and a ripper-support assembly; and a winch-support assembly; and wherein the actuator assembly includes a first end providing a first attachment point and also providing a second end having a second attachment point, and the first attachment point is configured to be attached to a connection point of the winch-support assembly, and the second attachment point is configured to be attached to a mounting point of the ripper-support assembly.

2. The apparatus of claim 1, wherein:
the winch assembly includes a hydraulic winch.

3. The apparatus of claim 1, wherein:
the winch assembly includes a guide assembly configured to slidably guide the winch assembly into and out of the ripper assembly.

4. The apparatus of claim 1, wherein:
the mounting assembly includes:
machine mounts configured to be fixedly attached to a rear section of the bulldozer crawler tractor; and
the machine mounts being spaced apart from each other in a side by side arrangement once the machine mounts are operatively fixedly attached to the rear section of the bulldozer crawler tractor.

5. The apparatus of claim 4, wherein:
a vehicle mount of the bulldozer crawler tractor defines a top swivel position configured to be attached to a first swivel point of a ripper-moving assembly of the ripper assembly.

6. The apparatus of claim 5, wherein:
the vehicle mount also defines a bottom swivel point configured to be attached to a third swivel point of a winch-support assembly of the ripper assembly.

7. The apparatus of claim 1, wherein:
the ripper assembly includes a combination of:
an actuator assembly;
a ripper-moving assembly;
a ripper-support assembly; and
a winch-support assembly.

8. The apparatus of claim 1, wherein:
the ripper-moving assembly is configured to move the ripper-support assembly with assistance from the actuator assembly, and the ripper-moving assembly provides a first swivel point configured to be pivotally attached to a top swivel position of the mounting assembly, and the ripper-moving assembly also provides a second swivel point configured to be pivotally attached to a lower swivel point of the ripper-support assembly.

9. The apparatus of claim 8, wherein:
the ripper-support assembly includes an upper swivel point configured to be pivotally attached to the second swivel point of the ripper-moving assembly, and the ripper-support assembly also includes the lower swivel point configured to be attached to a fourth swivel point of the winch-support assembly, and the ripper-support assembly also includes the mounting point configured to be attached to the second attachment point of the actuator assembly, and the ripper-support assembly also provides a longitudinally extending horizontally-extending support configured to support a ripper-shank assembly.

10. The apparatus of claim 9, wherein:
the winch-support assembly provides a third swivel point configured to be pivotally connected with a bottom swivel point of the mounting assembly, and the winch-support assembly also provides the fourth swivel point configured to be pivotally connected with the lower swivel point of the ripper-support assembly, and the winch-support assembly also provides the connection point configured to be connected with the first attachment point of the actuator assembly.

11. The apparatus of claim 7, wherein:
the ripper-moving assembly provides a first pin receiver configured to receive a safety lock pin, and the safety lock pin is configured to securely prevent movement of the ripper-moving assembly relative to the winch-support assembly once the safety lock pin is inserted into the first pin receiver.

12. The apparatus of claim 8, wherein:
the winch-support assembly provides a second pin receiver configured to receive a safety lock pin once a first pin receiver of the winch-support assembly and the second pin receiver of the winch-support assembly are aligned with each other; and
the safety lock pin is configured to lockably engage the winch-support assembly with the ripper-moving assembly to thereby lock the ripper-moving assembly into a stationary position, thereby eliminating relative movement between the winch-support assembly and the ripper-moving assembly.

13. The apparatus of claim 7, wherein:
the winch-support assembly provides lateral sidewalls that are spaced apart from each other; and
the winch assembly is operatively mounted between the lateral sidewalls of the winch-support assembly.

14. The apparatus of claim 10, wherein:
the winch assembly is configured to be slidable in and out of an open end defined by the winch-support assembly.

15. An apparatus, comprising:
a bulldozer crawler tractor;
a mounting assembly being configured to fixedly attach to the bulldozer crawler tractor;
a ripper assembly being configured to be operatively attached to the mounting assembly; and
a winch assembly being configured to be operatively mounted to the ripper assembly; and
wherein the ripper assembly includes a combination of:
an actuator assembly; and
a ripper-moving assembly; and
a ripper-support assembly; and
a winch-support assembly; and
wherein the actuator assembly includes a first end providing an first attachment point and also providing a second end having an second attachment point, and the first attachment point is configured to be attached to a connection point of the winch-support assembly, and the second attachment point is configured to be attached to a mounting point of the ripper-support assembly.

16. The apparatus of claim 15, wherein:
the ripper-moving assembly is configured to move the ripper-support assembly with assistance from the actuator assembly, and the ripper-moving assembly provides a first swivel point configured to be pivotally attached to a top swivel position of the mounting assembly, and the ripper-moving assembly also provides a second swivel point configured to be pivotally attached to a lower swivel point of the ripper-support assembly.

17. The apparatus of claim 16, wherein:
the ripper-support assembly includes an upper swivel point configured to be pivotally attached to the second swivel point of the ripper-moving assembly, and the ripper-support assembly also includes the lower swivel point configured to be attached to a fourth swivel point of the winch-support assembly, and the ripper-support assembly also includes the mounting point configured to be attached to the second attachment point of the actuator assembly, and the ripper-support assembly also provides a horizontally-extending support configured to support a ripper-shank assembly; and the winch-support assembly provides a third swivel point configured to be pivotally connected with a bottom swivel point of the mounting assembly, and the winch-support assembly also provides the fourth swivel point configured to be pivotally connected with the lower swivel point of the ripper-support assembly, and the winch-support assembly also provides the connection point configured to be connected with the first attachment point of the actuator assembly.

18. The apparatus of claim 15, wherein:

the ripper-moving assembly provides a first pin receiver configured to receive a safety lock pin, and the safety lock pin is configured to securely prevent movement of the ripper-moving assembly relative to the winch-support assembly once the safety lock pin is inserted into the first pin receiver.

* * * * *